United States Patent
Novak et al.

(10) Patent No.: US 9,166,866 B2
(45) Date of Patent: Oct. 20, 2015

(54) HYDRATION AND DEHYDRATION WITH PLACEHOLDERS

(71) Applicant: Microsoft Corporation, Redmond, WA (US)

(72) Inventors: Michael John Novak, Redmond, WA (US); Chris Guzak, Kirkland, WA (US); Sangeeta Ranjit, Newcastle, WA (US); Scott David Hoogerwerf, Seattle, WA (US); Amnon Itamar Govrin, Issaquah, WA (US); Kiernon Reiniger, Snohomish, WA (US); Oded Yehuda Shekel, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 280 days.

(21) Appl. No.: 13/874,474

(22) Filed: Apr. 30, 2013

(65) Prior Publication Data

US 2014/0324945 A1    Oct. 30, 2014

(51) Int. Cl.
*G06F 15/16* (2006.01)
*H04L 29/08* (2006.01)
*G06F 17/30* (2006.01)

(52) U.S. Cl.
CPC ...... *H04L 29/0854* (2013.01); *G06F 17/30153* (2013.01)

(58) Field of Classification Search
USPC .......... 703/203, 232, 236, 231, 234, 244, 246
See application file for complete search history.

(56) References Cited

U.S. PATENT DOCUMENTS

| | | | |
|---|---|---|---|
| 5,721,916 | A | 2/1998 | Pardikar |
| 7,603,397 | B1 | 10/2009 | Hagerstrom et al. |
| 8,331,566 | B1 | 12/2012 | Foote et al. |
| 8,417,746 | B1 | 4/2013 | Gillett, Jr. et al. |
| 2004/0019613 | A1 | 1/2004 | Jones et al. |
| 2004/0049513 | A1 | 3/2004 | Yakir et al. |
| 2005/0198385 | A1 | 9/2005 | Aust et al. |
| 2006/0200570 | A1 | 9/2006 | Stirbu et al. |
| 2006/0224993 | A1 | 10/2006 | Wong et al. |
| 2008/0010325 | A1 | 1/2008 | Yamakawa |
| 2009/0172274 | A1 | 7/2009 | Nochimowski et al. |

(Continued)

FOREIGN PATENT DOCUMENTS

| | | |
|---|---|---|
| WO | 95/23376 A1 | 8/1995 |
| WO | 2008/095237 A1 | 8/2008 |
| WO | 2013/036920 A1 | 3/2013 |

OTHER PUBLICATIONS

"International Search Report & Written Opinion for PCT Patent Application No. PCT/US2013/061056", Mailed Date: Jan. 2, 2014, Filed Date: Sep. 20, 2013, 9 Pages.

(Continued)

*Primary Examiner* — Lan Dai T Truong
(74) *Attorney, Agent, or Firm* — Bryan Webster; Kate Drakos; Micky Minhas

(57) ABSTRACT

Aspects of the subject matter described herein relate to file system placeholders. In aspects, placeholders may be used by a client to represent remote file system objects. The placeholders may include metadata and may also include none, some, or all of the content of the represented remote file system objects. In conjunction with placeholders and based on one or more factors, a client may hydrate or dehydrate file system objects of the client to follow user directives, inferred user intent, and storage policies of the client.

20 Claims, 7 Drawing Sheets

(56) References Cited

U.S. PATENT DOCUMENTS

| | | |
|---|---|---|
| 2009/0193107 A1 | 7/2009 | Srinivasan et al. |
| 2010/0325199 A1 | 12/2010 | Park et al. |
| 2012/0158891 A1 | 6/2012 | Dooley et al. |
| 2012/0167074 A1 | 6/2012 | Rajpure et al. |
| 2012/0179553 A1 | 7/2012 | Duggal |
| 2012/0215820 A1 | 8/2012 | Ogasawara et al. |
| 2013/0036135 A1 | 2/2013 | Brockey et al. |

OTHER PUBLICATIONS

"International Search Report & Written Opinion for PCT Patent Application No. PCT/US2013/060250", Mailed Date: Jan. 2, 2014, Filed Date: Sep. 18, 2013, 9 Pages.

"International Search Report & Written Opinion for PCT Patent Application No. PCT/US2013/061071", Mailed Date: Jan. 2, 2014, Filed Date: Sep. 21, 2013, 10 Pages.

"Basic Concepts", Retrieved at <<http://technet.microsoft.com/en-us/library/cc938459.aspx>>, Mar. 16, 2011, pp. 3.

U.S. Patent Application entitled "File Management With Placeholders"; First named inventor: Michael John Novak; filed Apr. 30, 2013; U.S. Appl. No. 13/873,241.

U.S. Patent Application entitled "Searching and Placeholders"; First named inventor: Michael John Novak; filed Apr. 30, 2013; U.S. Appl. No. 13/873,264.

U.S. Patent Application entitled "Streaming Content and Placeholders"; First named inventor: Michael John Novak; filed May 1, 2013; U.S. Appl. No. 13/874,488.

"International Search Report & Written Opinion for PCT Patent Application No. PCT/US2013/061072", Mailed Date: Feb. 21, 2014, Filed Date: Sep. 21, 2013, 11 Pages.

HYDRATION AND DEHYDRATION WITH PLACEHOLDERS

BACKGROUND

Today, it is not uncommon for a family or even a single person to have multiple computing devices such as a desktop computer, a laptop, a smartphone, an internet-enabled television, a set top box, a gaming device, a reading tablet, and so forth. In addition, a user may have thousands of files that include pictures, audio, documents, and the like that are stored in the cloud or elsewhere. A user may want to access the files from one or more of the computing devices available to the user.

Downloading all of the user's content to each of the user's devices may not be possible as some devices may have very limited storage. Furthermore, even when a computing device has extensive storage, downloading the content to the computing device may consume considerable bandwidth, be costly, and take a long time.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to file system placeholders. In aspects, placeholders may be used by a client to represent remote file system objects. The placeholders may include metadata and may also include none, some, or all of the content of the represented remote file system objects. In conjunction with placeholders and based on one or more factors, a client may hydrate or dehydrate file system objects of the client to follow user directives, inferred user intent, and storage policies of the client.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
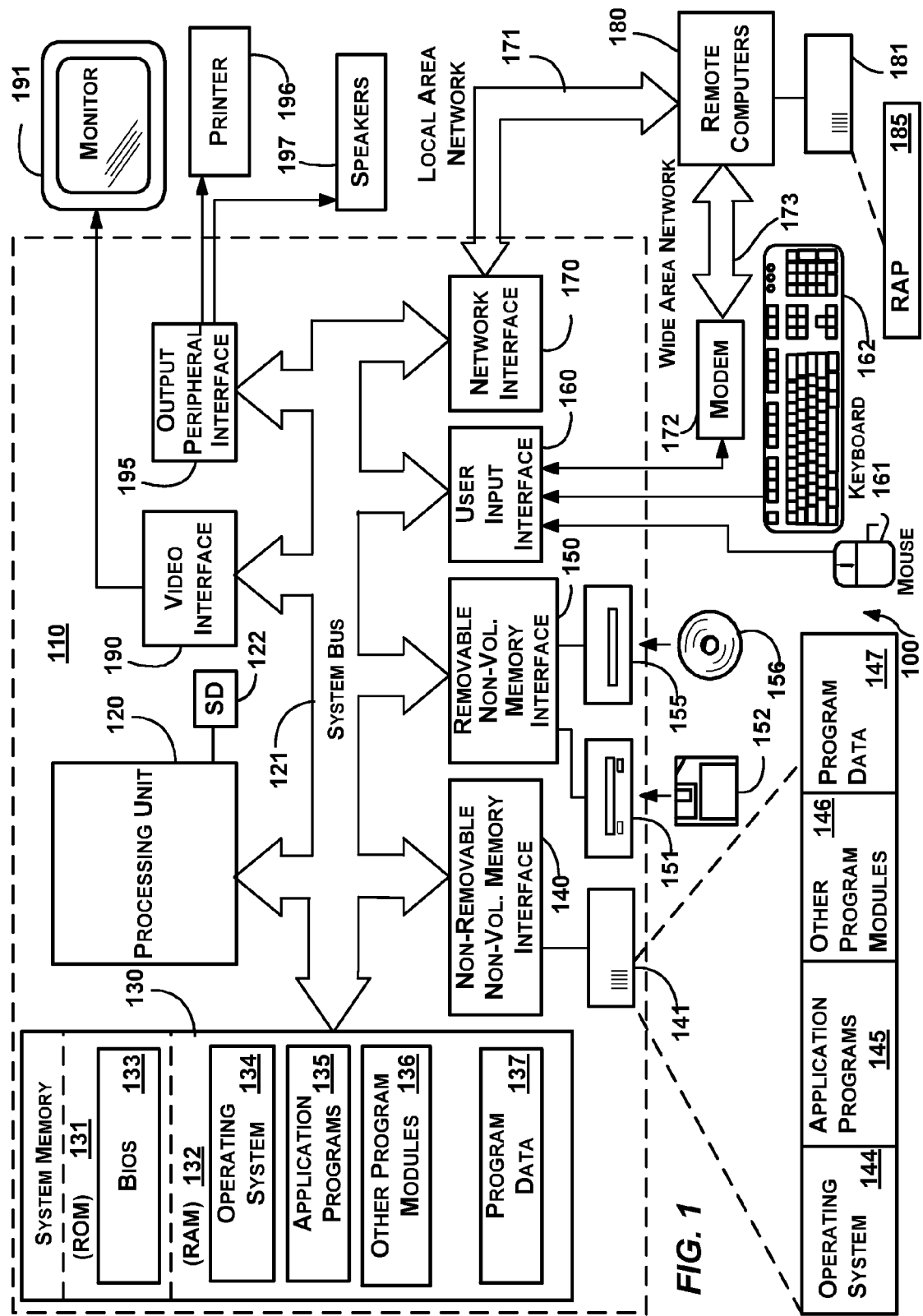
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Placeholders

In accordance with an aspect of the subject matter described herein, placeholders may be used. A placeholder may include a data structure that represents a file system object. A file system object may be a file or a directory. A directory may include zero or more files and may be a traditional file directory or some other collection or container of files. For simplicity, the term file is often used herein, but it is to be understood that the teachings herein may also be applied to directories without departing from the spirit or scope of aspects of the subject matter described herein.

A placeholder may be stored on a local storage device of a machine. In one implementation, a placeholder may indicate that content associated with the placeholder is available in a place other than a file system of the machine (hereinafter sometimes referred to as a local file system or a client file system). For example, a placeholder may indicate that content associated with the placeholder is stored in one of the cloud storage systems illustrated in FIG. 3.

In another implementation, a placeholder may indicate that the content is accessible through an application that resides on the machine. This application may store the content in memory, a local file system or a remote file system, may generate the content, may perform a combination of the above, or the like. Even if the file system could obtain the content directly, the file system may still rely on the application to access the content of the file.

In one implementation, for a placeholder where the associated content is relatively small (e.g., less than a predetermined, configurable, or calculated threshold), a copy of the entire content associated with the placeholder may also be stored in the placeholder. Storing data "in the placeholder" is meant to include storing the data in the data structure of the placeholder and/or storing the data in a local storage location indicated by the placeholder.

Depending on implementation, a placeholder may include various levels of details about a file. At a minimum, a placeholder includes data that identifies a file in a remote storage system. For example, a placeholder may indicate a specific cloud storage system at which the content may be found together with information (e.g., an identifier) that identifies the file to the cloud storage system.

A placeholder may include extrinsic metadata and/or intrinsic metadata of a file. Extrinsic metadata is any metadata that is stored outside of the content of the file. For example, extrinsic metadata may include name, size, date modified, date created, date last accessed, attributes of the file, version, other metadata maintained by the file system, and the like.

Intrinsic metadata is any metadata that is stored inside the content of the file. For example, for an audio file, intrinsic metadata may include artist name, album name, year, title of song, rating, tags, comments, genre, length, bit rate, and the like. For an image such as a camera picture, intrinsic metadata may include, for example, author, date taken, acquiring program name, dimensions, resolution, bit depth, compression, camera maker, camera model, f-stop, exposure time, other information, and the like.

The examples of intrinsic and extrinsic metadata described above are not intended to be all-inclusive or exhaustive of the types of intrinsic and extrinsic metadata. Indeed, based on the teachings herein, those skilled in the art will readily recognize other extrinsic and intrinsic metadata that may be used in accordance with the teachings herein without departing from the spirit or scope of aspects of the subject matter described herein.

In one implementation, a placeholder may include extrinsic metadata of a file such as name of the file, a size of the file, a date that the file was modified, and a date that the file was created. In another implementation, in addition to the above, a placeholder may also include attributes of the file.

In another implementation, a placeholder may include some or all of the intrinsic metadata of a file.

In one implementation, a placeholder may include some or all of the searchable text of a file. For example, a word processing document may have content that includes text and formatting. A placeholder may include the beginning N characters, words, paragraphs, pages, or the like of the text of the word processing document without the formatting, where N is predetermined, configurable, or determined on the fly.

In one implementation, a placeholder may include an indication of the language(s) of the searchable text. For example, a placeholder may include data that indicates that the searchable text is written in English. As another example, a placeholder may include data (e.g., a tag or other data) that indicates that a portion of the text is written in English and data (e.g., another tag or other data) that indicates that another portion of the text is written in Spanish.

As another example, a presentation program may have relatively little text compared to other data used for a presentation. In this example, a placeholder may include all the text of the presentation while omitting other data used for the presentation.

In one implementation, a placeholder may include a thumbnail of an image. The image may be included in the content of the file associated with the placeholder while the thumbnail may be generated from the image or also included in the content of the file. In one embodiment, the thumbnail included in the placeholder may be of a relatively small size that may be predefined, configurable, or determined on the fly.

In one implementation, a placeholder may include data that identifies how to obtain larger thumbnails of the content associated with the placeholder. For example, a placeholder may include an address of a service from which a larger thumbnail of a file may be requested. The service may be able to accept input that indicates the size of the thumbnail that is to be provided.

Likewise, in one implementation, a placeholder may include a lower fidelity sample (or data that identifies how to obtain such as sample) of content of a file associated with the placeholder. For example, a placeholder may include a lower fidelity sample (or link to a service) of a music, video, or other type of file.

In one implementation, a placeholder may include a data structure (e.g., a bitmap, linked list, or other data structure) that indicates which portions of the associated content are located on the local file system. This data structure may be consulted when a program seeks to access the content. If the data structure indicates that the requested content is available locally, the requested content may be obtained from local storage. If not, other actions may be taken to obtain the requested content from remote storage prior to providing the program with the content.

In one implementation, a placeholder may have a flag that indicates whether the content of the file is to be made available when offline. As indicated previously, a client may periodically lose connectivity to remote storage upon which content associated with a placeholder is found. If the flag is set, when the client is online, content for the placeholder may be downloaded to local storage and be maintained there so that the content is available even when the remote storage is unavailable.

Various embodiments may have placeholders that include any one or more of the data indicated above.

A placeholder may be used to give the illusion that a file resides on a local file system even when the content of the file resides remotely. This illusion may be maintained even when the remote file system is not reachable. This may be done by inserting the placeholder into a namespace of a local file system. The file system may be modified to recognize placeholders and to display information about a file represented by the placeholder as appropriate. For example, the file system may display the names and relevant metadata for a placeholder when a user navigates through the namespace of the local file system.

Placeholders may be used to vastly reduce the amount of storage space consumed. For example, instead of storing the content for large videos locally, placeholders may be used to indicate that the videos are available. Because the placeholders may use a much smaller amount of space than the actual content of the video, even a relatively small local storage device may include placeholders for a vast collection of files that include a significant amount of content.

Placeholders may be used when a remote storage system is unavailable. For example, when network connectivity is lost or not available, a machine may use locally stored placeholders to navigate and perform other operations on the namespace of a file system.

A placeholder is persisted even when the client machine is shutdown. Thus, the placeholder is still available when the client machine is restarted. This persistence behavior may be implemented by storing the placeholder on a local storage of the client.

Figure 2:
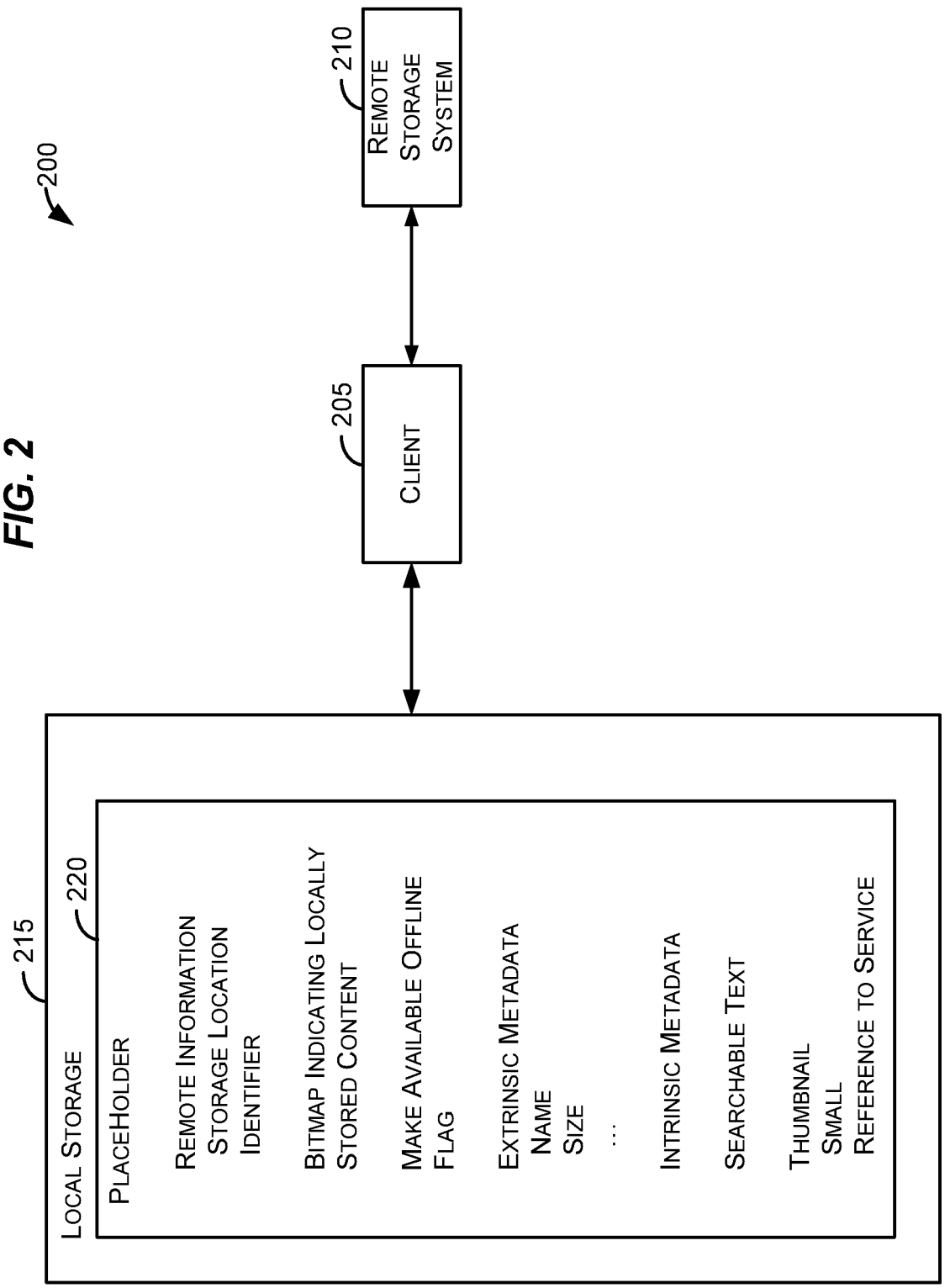
FIGS. 2-3 are block diagrams that generally represent exemplary components of systems configured to use placeholders in accordance with aspects of the subject matter described herein.
Figure 3:
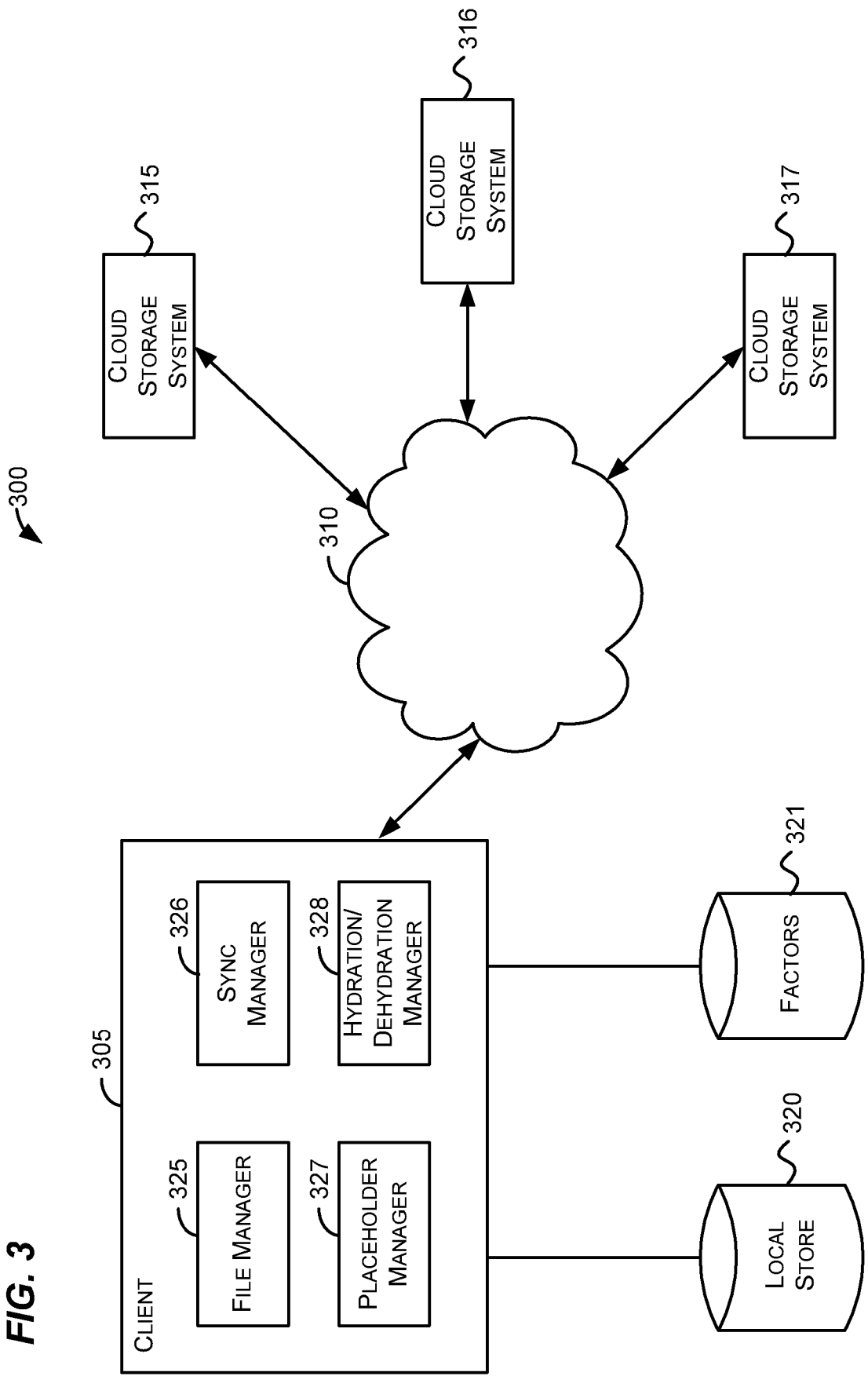

FIGS. 2-3 are block diagrams that generally represent exemplary components of systems configured to use placeholders in accordance with aspects of the subject matter described herein. The components illustrated in FIGS. 2-3 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIGS. 2-3 may be included in other components (shown or not shown) or placed in subcomponents without departing from the spirit or scope of aspects of the subject matter described herein. In some embodiments, the components and/or functions described in conjunction with FIGS. 2-3 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIGS. 2-3 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIGS. 2-3 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

Turning to FIG. 2, the system 200 may include a client 205, a remote storage system 210, local storage 215, a placeholder 220, and may include other components (not shown). The client 205 may have direct access to the local storage 215 and be connected to the remote storage system 210 through the use of a cloud network.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The local storage 215 may include any storage media capable of storing data. For example, the local storage 215 may include volatile memory (e.g., a cache) and non-volatile memory (e.g., a persistent storage). The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The local storage 215 may be external, internal, or include some components that are internal and some components that are external to the client 205. In one implementation, the local storage 215 may include any storage that is housed in a machine hosting the client 205. In another implementation, the local storage 215 may include storage that is directly connected to the machine hosting the client 205. For example, the local storage 215 may be connected to the machine via a USB link, an IEEE 1394 link, an optical link, another hardwired link, or the like.

The remote storage system 210 may include one or more computers that are arranged to store and provide access to data. Access as used herein may include reading data, writing data, deleting data, updating data, a combination including two or more of the above, and the like. The remote storage system 210 may be connected to the client 205 via a network such as the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

In one example, the remote storage system 210 may comprise a data center where the computing devices are located in a single physical location. In another example, the remote storage system 210 may include computing devices and storage that are attached to the cloud at different locations. In one example, the remote storage system 210 may comprise a single server or other computing device that provides access to one or more storage devices. In one example, the remote storage system 210 may comprise a computing device that is not on the client 205's local area network (LAN). In another example, the remote storage system 210 may comprise any storage that is not housed in or directly connected to the client 205. In another example, the remote storage system 210 may include storage that is not available to the client 205 when the client is not connected to a network from which the storage is accessible.

Sometimes the term cloud storage system is used herein. This is not intended to be limiting with respect to remote storage systems to which the teachings herein may be applied but to provide an example of a remote storage system that may be used without departing from the spirit or scope of aspects of the subject matter described herein. Whenever the term cloud storage system is used herein, it is to be understood that in other embodiments, other types of remote storage systems may be used without departing from the spirit or scope of aspects of the subject matter described herein.

While the local storage 215 may be almost continuously available to the client 205 or may be readily made available by means available to the user (e.g., by plugging in a connector) the remote storage system 210 may, at times, become unavailable to the client 205. For example, if the client 205 is hosted on a laptop, the laptop may be moved to a location that does not have Internet access. As another example, network outages may disrupt the connectivity of the client 205 to the remote storage system 210. As another example, the remote storage system 210 may become inoperative or may be shut down or disconnected for maintenance or other purposes. Without placeholders, when connectivity with the remote storage system 210 is lost, the client 205 may not be able to navigate the namespace or perform operations on a file where the entire file content is not available on the local storage 215.

The placeholder 220 illustrates various exemplary data fields that may be stored in a placeholder stored on the local storage 215. Although only one placeholder is shown in FIG. 2, more often, there will be multiple placeholders stored on the local storage 215. For example, for a given namespace, there may be one placeholder for each remote file system object if the content of the remote file system object does not completely exist on the local storage 215. As another example, for the given namespace, there may also be placeholders for remote file system objects even when the entire content of the remote file system objects exists on the local storage 215. This second set of placeholders may also be stored on the local storage 215 for files having content with a size less than a given threshold as mentioned previously.

A namespace may include an identifier (e.g., name or other identifier) for each file of a file system together with hierarchy information regarding the file. For example, a namespace may include a namespace entry corresponding to D:\DIR1\FILE1.TXT. This namespace entry indicates the name of a file (e.g., FILE1.TXT) and indicates that the file exists in a directory (e.g., DIR1). A namespace may also include other metadata. A namespace may have a one-to-one or some other mapping with file system information and may represent virtual folder hierarchies.

Hydration and Dehydration

As mentioned previously, there may be various reasons to avoid storing all files of a user on each device of the user. Hydration and dehydration may be used together with placeholders to address this issue. With the use of placeholders, a file may be completely hydrated, partially hydrated, or dehydrated.

To completely hydrate a file, the contents the file represented by a placeholder may be downloaded and stored on the client file system. Upon being completely hydrated, in one implementation, the placeholder may be purged from the local file system and replaced with regular file system metadata. In another implementation, even though the contents and metadata of a file are stored on the client file system, the placeholder may remain and be used in conjunction with or instead of the regular file system metadata maintained for the file.

When a file is partially hydrated, this indicates that at least a portion of the content of the file represented by a placeholder is stored on the client file system. As indicated earlier, a data structure of the placeholder may indicate which portions of the file are stored on the client file system and which portions of the file are not stored on the client file system. In one implementation, at least as long as a file is partially hydrated, a corresponding placeholder remains on the client file system.

When a file is dehydrated, other than intrinsic metadata, if any, included in the content (and stored in the placeholder), the content of the file is not stored on the client file system.

Whether files for a client are to default to being hydrated or dehydrated may be configurable or hard-wired. In one implementation, files may default to being dehydrated except for small files (e.g., having a size under a threshold). Even for these small files that are hydrated, the client file system may, in one implementation, use placeholders for the small files and may not replace the placeholders with regular file system metadata unless instructed otherwise (as described in more detail below).

As mentioned previously, a user may have several devices that have different capabilities for storing content that the user has stored in a cloud storage system. Each device may have a different set of placeholders. Thus, on one device, a file may be represented by a placeholder while on another device, the same file may be completed stored on the device with no placeholder present.

Whether a file is to be hydrated, partially hydrated, or dehydrated may depend on various factors. These factors include, for example:

1. Explicit user input. A user may explicitly indicate that a file is to be made available offline. In this case, a user expects the file to be available at all times—whether the client is online with respect to the cloud storage system or not. When a user explicitly indicates that a file is to be made available offline, a flag may be set to so indicate. Until this flag is cleared, the client attempts to maintain an updated copy of the file (both metadata and content) on the client file system. If the file changes while the client is offline, when the client becomes online, the file is synchronized. When this flag is set, in one implementation, the client file system does not purge the content of the file and does not dehydrate the file even if other factors indicate that additional space is needed on the client file system.

In addition, in one implementation, when a user explicitly indicates that a file is to be made available offline, after the file is stored on the client file system, the placeholder for the file, if any, is removed, and the file may be accessed through regular file system mechanisms. In another implementation, when a user explicitly indicates that a file is to be made available offline, after the file content is completely available on the client file system, the placeholder for the file remains. In this implementation, a flag of the placeholder may be set to indicate that the file may be accessed through regular file system mechanisms.

Furthermore, in one implementation, the user may explicitly indicate that the file is to be made available offline on a device-by-device basis, on a set of devices (e.g., having certain characteristics), or on all of the user's devices. Thus, a user may indicate that a file is to be made available offline for one device while not so indicating on another device.

2. Inferred user input. A user's action with respect to a file may be interpreted as indicating that a file is to be made available offline. A user may take certain actions with respect to a file. For example, a user may create, open, or edit content of a file or the metadata of a file.

In one implementation, when a user creates or edits a file on a device, this may be interpreted as hinting that the file is to be made available offline for that device. In response, the file system may use this hint as a factor in determining to make the file available offline.

In one implementation, when a user opens a file on a device, this may be used as a factor in determining whether to make the file available offline for that device. An additional factor for whether to make the file available offline for that device may be the mode in which the file was opened. For example, the client may infer that a file that is opened for read/write is to be treated as a significant factor in whether the file is to be made available offline while a file that is opened for read only may be treated as less of a factor for whether the file is to be made available offline.

3. Type of file. Files may be different types (e.g., word processing, spreadsheet, or other document, an image, video, and so forth). In the absence of other factors, it may be desirable to have certain file types (e.g., images, videos, and so forth) be dehydrated and to have other file types (e.g., word processing, spreadsheets, and other documents, and so forth) be hydrated. In one implementation, the factor for whether each file type is hydrated or dehydrated may be hard-wired or configured.

The factor used for a type of file may be further based on a number of files having the file type. For example, if there are relatively many files having a certain file type (e.g., an image file type) and relatively few files having another file type (e.g., a word processing file type), a factor may be assigned to each type to favor dehydration for file types where there are relatively many files and to favor hydration for file types where there are relatively fewer files.

4. Size of file. In the absence of other factors, the larger the file, the more desirable it may be to dehydrate the file. For example, it may be more desirable to dehydrate a multi-gigabyte video than thousands of smaller files.

5. Stale content. A user may open a file on a first device and later the user may edit the file on a second device. The changes made while editing the file on the second device may be propagated to the cloud storage system. When the user edits the file on the second device, the content becomes stale on the first device. In one implementation, this staleness may be detected after the changes are propagated to the cloud storage system (e.g., during synchronization between the first device and the cloud storage system).

In one implementation, if the file has been changed on the cloud storage system, this may be used as a factor to dehydrate the file on a client. In another implementation, instead of dehydrating the file, the changes to the file may be downloaded from the cloud storage system to the client and used to update the file on the client.

6. Available client storage. One factor for whether a file is to be hydrated or dehydrated involves the available client storage. If a client has significant free client storage space (e.g., measured in percentage, total available bytes, some other measure, or the like), this may favor hydrating files and may disfavor dehydrating files. On the other hand, if a client has a relatively small amount of free client storage space, this may favor dehydrating files and may disfavor hydrating files.

7. Available client bandwidth. If a client has significant bandwidth (e.g., above a threshold), this may favor dehydrating files as they may readily be rehydrated when needed. If a client has relatively little bandwidth (e.g., below a threshold), this may favor not dehydrating files as the files may not be readily rehydrated when needed.

8. Cost of bandwidth. The cost of downloading content may be used as another factor in determining whether to hydrate or dehydrate files.

9. Frequency of use. How frequently a file is used may be used as another factor in determining whether to hydrate or dehydrate the file. If a file is used more frequently that other files, this may favor not dehydrating the file. If the file is used infrequently, this may favor dehydrating the file. Frequency of use may be weighted based on time such that more recent uses are weighted more than less recent uses.

10. Last use. How recently a file was last used may be used as another factor in determining whether to hydrate or dehydrate the file. For example, it may be more effective to dehydrate a file that has not been used in years than a file that was used in the last few minutes.

The above factors are not intended to be all-inclusive or exhaustive of factors that may be used in determining whether to dehydrate or hydrate a file. Based on the teachings herein, those skilled in the art may recognize other factors that may be used without departing from the spirit or scope of aspects of the subject matter described herein.

Some dehydration/hydration activities may take place when certain actions occur. For example, when a client becomes aware that a file is stale, the client may dehydrate the file. As another example, when a client attempts to access content of a file where the content does not exist on the client file system, the client may hydrate or at least partially hydrate the file so that the content may be accessed. As another example, where a client attempts to copy or move the file to another namespace, the client may hydrate the file so that this operation may proceed. As another example, if the client updates properties of the file, the client may hydrate the file. As yet another example, when a user indicates that a file is to be made available offline, the client may hydrate the file as soon as possible (e.g., when the client is online with respect to a cloud storage system having the file).

In one implementation, fully hydrating a file may be delayed even when factors indicate that the file may need to be fully hydrated. For example, if a dehydrated file is opened in read/write mode, fully hydrating the file may be delayed until the first read of the file or possibly until the first write. This may done, for example, among other reasons, to avoid situations in which full hydration is not immediately required. For example, an application may open a file in read/write mode but may not write to the file. As another example, an application may open a file in read/write mode but may wait to write to the file until the application has completely read the file.

Other dehydration/hydration activities may take place at other designated times. For example, a maintenance process may execute periodically to determine whether dehydration/hydration is needed and, if so, what files are to be hydrated, partially hydrated, or dehydrated.

In one implementation, the maintenance process may determine that dehydration or hydration is needed based on the factors indicated above. If dehydration is need, in one implementation, the maintenance process may use a formula such as, for example:

$$Score = f_1(w_1, x_1) + f_2(w_2, x_2) + \ldots + f_3(w_n, x_n)$$

where $w_1 \ldots w_n$ are weights, $x_1 \ldots x_n$ are factors and $f_1 \ldots f_n$ represent functions that operates on a weight and a factor. Where higher scores favor hydration and lower scores favor dehydration, files with the highest scores may be hydrated while files with the lowest scores may be dehydrated.

Where hydration is explicitly desired, an appropriate function may be selected to ensure that the score meets the hydration threshold. Likewise, when dehydration is necessary for a particular factor, an appropriate function may be selected to ensure that the score will cause dehydration.

Although an exemplary formula has been provided above, there is no intention to limit scoring formulas to the one described. For example, a score may be calculated based on a single function that receives as inputs the weights and factors. Based on the teachings herein, those skilled in the art may recognize other scoring functions that may be used without departing from the spirit or scope of aspects of the subject matter described herein.

In another implementation, a set of policies may be used to determine whether to hydrate or dehydrate a file. The policies may be based on one or more of the factors described previously. In one embodiment, a policy may be expressed as one or more rules or conditions that are to be satisfied before hydrating or dehydrating a file. For example, if free space is less than a configurable threshold and a particular file is larger than another threshold and has not been used for a specified period of time, a policy may indicate that this file is to be dehydrated.

Turning to FIG. 3, the system 300 may include a client 305, a cloud 310, cloud storage systems 315-317, a local store 320, a factors store 321, and other components (not shown). The client 305 may include a file manager 325, a synchronization manager 326, a placeholder manager 327, a dehydration manager 238, and other components (not shown).

The components of FIG. 3 may be implemented using the hardware and/or software of one or more computing devices as described previously. In one implementation, the local store 320 and the factors store 321 may be implemented on a single file system. In another implementation, the local store 320 and the factors store 321 may be implemented on separate file systems. The storage device(s) that implement the local store 320 and the factors store 321 may be implemented in a similar manner as the local storage 215 of FIG. 2 and may be external, internal, or include some components that are internal and some components that are external to the client 305.

The local store 320 may have computer storage elements that maintain (e.g., persist) file system metadata for local file system objects of a local file system of the client and that maintain placeholders for remote file system objects of a cloud storage system. As mentioned previously, the placeholders may include metadata of the remote file system objects without requiring that content of the remote file system objects exist in the local store 320.

The factors store 321 may have computer storage elements that maintain factors evaluated to determine actions to take with respect to local file system objects. The actions may include, for example: to hydrate, to partially hydrate, to dehydrate, and to do nothing with respect to a local file system object, and to do nothing with respect to the local file system object.

The file manager 325 may be structured to create, via the file system metadata and the placeholders, a namespace that includes the local file system objects and the remote file system objects. The file manager 325 may be further structured to provide, via an interface, metadata for the local file system objects and the remote file system objects regardless of whether connectivity exists to the cloud storage system.

In absence of connectivity to a cloud storage system, the file manager 325 may still allow operations to proceed on both files that reside locally and files represented by placeholders. For example, the file manager may update a file system data structure of the local file system to indicate an operation performed on a file system object represented by a placeholder even when the content of the file system object does not reside completely on the local store. As another example, the file manager 325 may update a namespace to reflect an operation such as a rename, move, delete, restore, create, copy operation, or the like.

The synchronization manager 326 may be structured to discover changes (e.g., content changes, metadata changes including intrinsic, extrinsic, and namespace changes, other changes and the like) that occurred to file system objects in the absence of connectivity to the cloud storage system and, when connectivity is re-established with the cloud storage system, to synchronize the changes with the cloud storage system.

In different implementations, the synchronization manager 326 may use various methods for discovering changes. For example, in one implementation, the synchronization manager 326 may discover changes by examining the operations log 321. As another example, in another implementation, the synchronization manager 326 may discover changes by comparing a state of file system and file system objects prior to the changes with a state of the file system and file system objects after the changes.

The placeholder manager 327 may be structured to create, populate, and maintain the placeholders to ensure that a placeholder exists for each remote file system object in the namespace at least if the content of the remote file system object does not completely exist on the local store 320. As mentioned previously, a placeholder may also be maintained on the local file system when the content of the remote file system object does completely exist on the local store 320.

The hydration/dehydration manager 328 may be structured (e.g., via hardware and/or software components) to evaluate one or more factors to determine actions to take with respect to the local file system objects. The action selected for one local file system object may be different from the action selected for another local file system object. The action to take for a local file system object may be selected from actions that include, for example: to hydrate, to partially hydrate, to dehydrate, and to do nothing with respect to the local file system object.

The hydration/dehydration manager 328 may be further structured to perform hydration and dehydration actions with respect to local file system objects. The hydration/dehydration manager 328 may infer whether a local file system object is to remain available while the client is offline with respect to the cloud storage system based on an observed user action with respect to the local file system object as described previously.

The cloud storage systems 315-317 may include one or more storage devices together with one or more computing devices that provide access to those storage devices. Although three cloud storage systems are shown in FIG. 2, in other implementations, there may be any number of cloud storage systems.

FIGS. 4-7 are flow diagrams that generally represent exemplary actions that may occur in accordance with aspects of the subject matter described herein. For simplicity of explanation, the methodology described in conjunction with FIGS. 4-7 is depicted and described as a series of acts. It is to be understood and appreciated that aspects of the subject matter described herein are not limited by the acts illustrated and/or by the order of acts. In one embodiment, the acts occur in an order as described below. In other embodiments, however, two or more of the acts may occur in parallel or in another order. In other embodiments, one or more of the actions may occur with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 4:
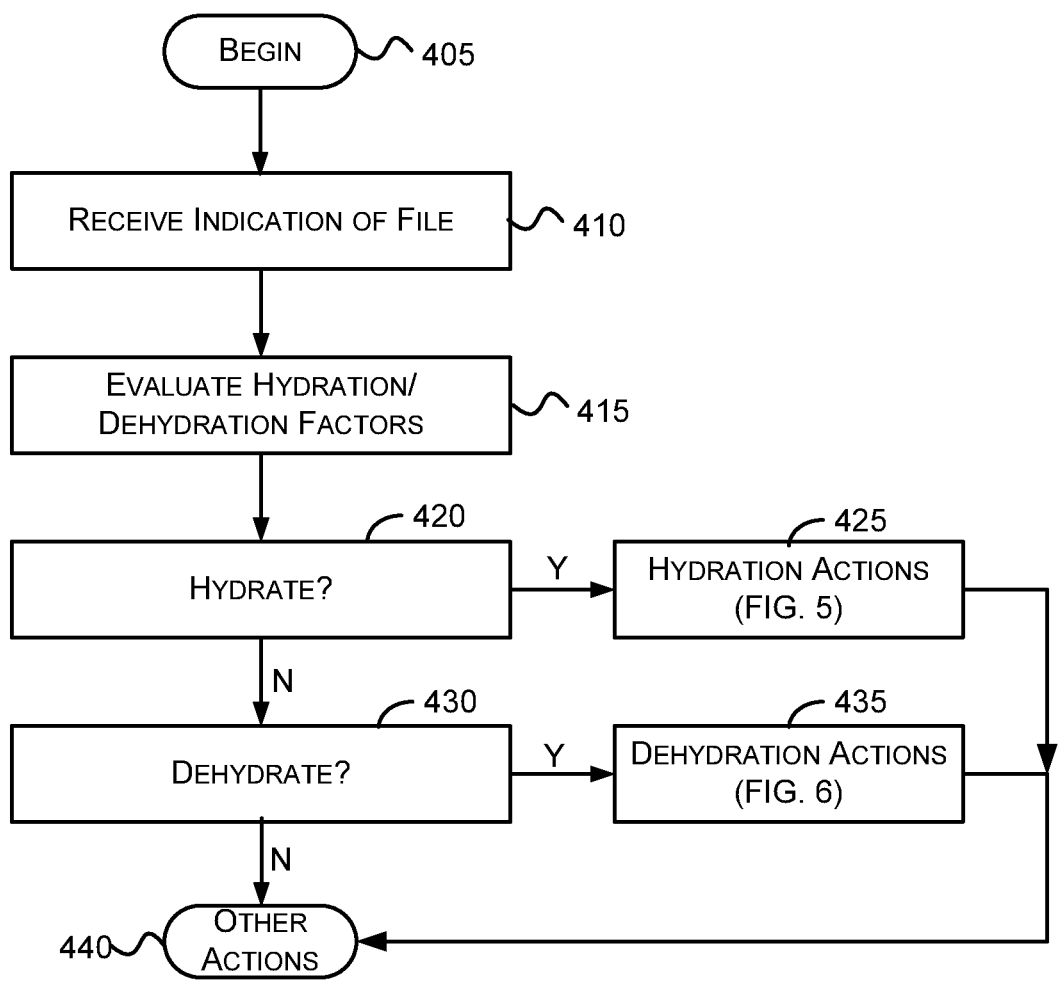
FIGS. 4-6 are flow diagrams that generally represent exemplary actions that may occur from a client perspective in accordance with aspects of the subject matter described herein.
Figure 5:
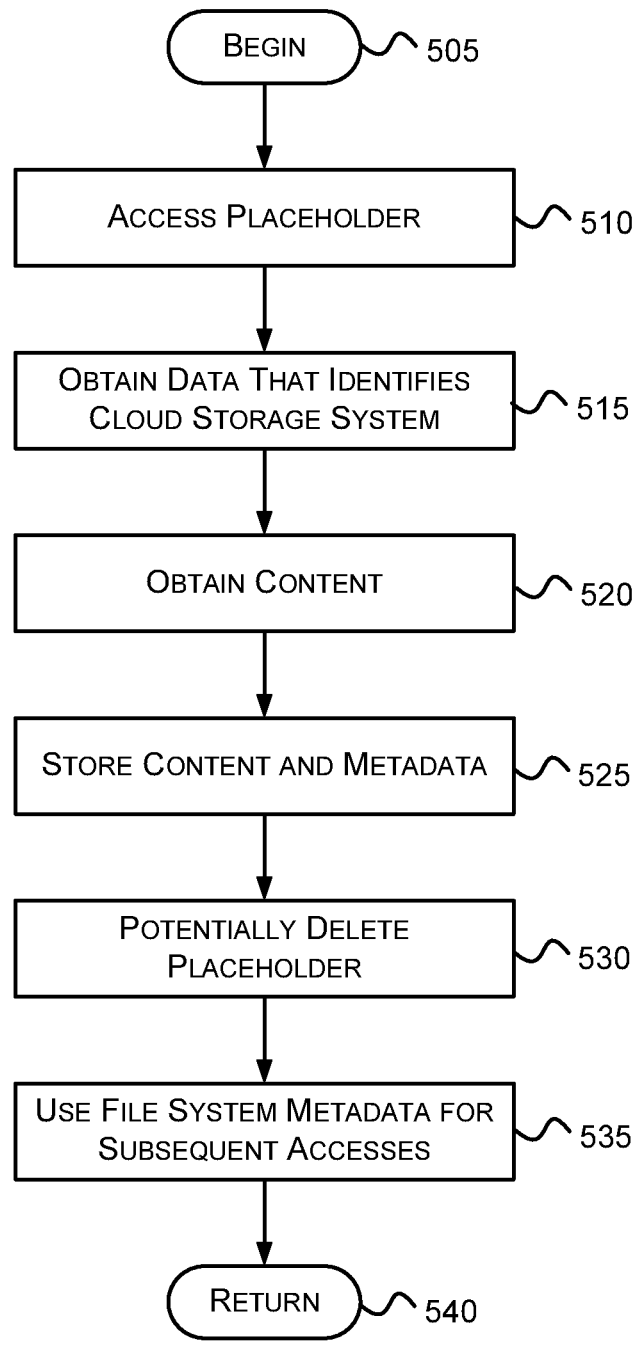
Figure 6:
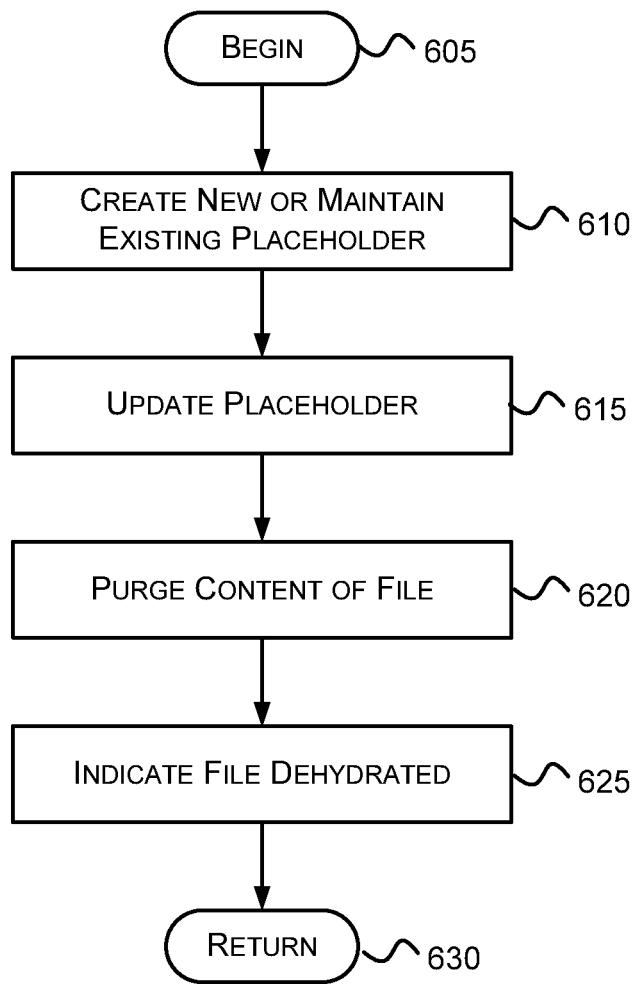

FIGS. 4-6 are flow diagrams that generally represent exemplary actions that may occur from a client perspective in accordance with aspects of the subject matter described herein. Turning to FIG. 4, at block 405, the actions begin.

At block 410, an indication is received of a file of a local file system of a client. For example, referring to FIG. 3, the hydration/dehydration manager 328 may receive an indication of a file by reading a namespace entry from the local store 320. As another example, the hydration/dehydration manager 328 may receive an indication of a file that a user has requested to open.

At block 415, factors may be evaluated to determine whether to hydrate, dehydrate, partially hydrated, or do nothing with respect to the file. For example, referring to FIG. 3, for a file that is opened, the hydration/dehydration manager 328 may determine the file needs to be hydrated. As another example, in communicating with a cloud storage system, the client, the client 305 may be informed that a file has become stale. In response, the hydration/dehydration manager 328 may determine that the file needs to be dehydrated. As another example, a user may indicate that a file is to remain available while the client is offline. In this example, the hydration/dehydration manager 328 may determine that the file needs to remain hydrated even if other factors favor dehydrating the file.

As another example, the hydration/dehydration manager 328 may infer that a file is to remain available based on an observed user action with respect to the file. For example, if the user creates or edits the file on the client 305, the hydration/dehydration manager 328 may infer that the file is to remain available on the client 305 even while the client is offline. As another example, if the user opens the file in at least write mode, the hydration/dehydration manager 328 may infer that the file is to remain available on the client 305.

As another example, if space is needed on a local file system of the client 305 (e.g., as determined by a first configurable threshold) and the file (e.g., a video, image, data, or other file) has a relatively large size (e.g., as determined by a second configurable threshold), the hydration/dehydration manager 328 may determine that the file is to be dehydrated.

As another example, if the client 305 receives a request to move the file from a namespace that is associated with a first cloud storage system to a namespace that is associated with a second cloud storage system, the hydration/dehydration manager 328 may determine that the file needs to be hydrated to complete the move. When a namespace of a client is associated with a cloud storage system, this may mean that a client is configured to synchronize the files indicated by the namespace with the cloud storage system.

At block 420, if the determined action is to hydrate a file, the actions continue at block 425; otherwise, the actions continue at block 430.

At block 425, hydration actions are performed as described in more detail in conjunction with FIG. 5.

At block 430, if the determined action is to dehydrate a file, the actions continue at block 435; otherwise, the actions continue at block 440.

At block 435, dehydration actions are performed as described in more detail in conjunction with FIG. 6.

At block 440, other actions, if any, are performed. For example, referring to FIG. 3, the hydration/dehydration manager 328 may determine that no actions are to be taken with respect to a file. In this case, the hydration/dehydration manager 328 may consider factors for another file (e.g., if performing a maintenance task) or may pause, sleep, do nothing, or the like (e.g., if receiving information about a particular file).

As another example, the hydration/dehydration manager 328 may partially hydrate or partially dehydrate a file if factors favor this behavior. For example, if some content of a file has not been accessed in a relatively long time (e.g., as determined by a threshold), while other content of the file has been access more recently, the hydration/dehydration manager 328 may dehydrate the content that has not been accessed for a long time.

Turning to FIG. 5, at block 505, the actions begin. At block 510, hydration/dehydration manager 328 may access the placeholder that represents the indicated file via the placeholder manager 327.

At block 515, data may be obtained from the placeholder. The data may include data that identifies a cloud storage system that stores the content of the file. For example, referring to FIG. 3, the placeholder manager 327 may be used to obtain placeholder data that identifies the cloud storage system 316.

At block 520, content is obtained from the identified cloud storage system. For example, referring to FIG. 3, the client 305 may obtain content from the cloud storage system 316. The obtained content is content for the file represented by the placeholder.

At block 525, the content and metadata are stored on the local file system. For example, referring to FIG. 3, the client 305 may store the content of the file on the local store 320. The client 305 may also copy the metadata of the file to the local store 320 from the placeholder and/or the cloud storage system 317.

At block 530, the placeholder may be deleted. For example, referring to FIG. 3, after fully hydrating a file (e.g., copying the contents to the local file system and updating the metadata of the file for the local file system), in one implementation, the client 305 may then delete the placeholder. In another implementation, the placeholder may be updated to indicate that the file system object is fully hydrated.

At block 535, after the file is fully hydrated and until the file system object is dehydrated again, the file system metadata may be used for subsequent accesses to the file system object.

At block 540, the actions continue at block 440 of FIG. 4.

Turning to FIG. 6, at block 605, the actions begin. At block 610, a new placeholder is created or an existing placeholder is maintained. For example, referring to FIG. 3, the hydration/dehydration manager 328 may instruct the placeholder manager 327 to create or maintain a placeholder for a file that is being dehydrated. For example, if a placeholder already exists for a file that is being dehydrated, this placeholder may be maintained (e.g., kept on the local file system). If a placeholder does not exist for a file that is being dehydrated, a placeholder may be created for the file.

At block 615, the placeholder is updated to include the metadata of the file that is about to be dehydrated. For example, referring to FIG. 3, the client 305 may update the created placeholder with the metadata of the file that is about to be dehydrated. For a maintained placeholder (e.g., for a partially dehydrated file), in one example, the metadata of the file is expected to already be in the placeholder.

At block 620, content of the file is purged from the local file system while maintaining the metadata of the file in the placeholder. For example, referring to FIG. 3, the client 305 may purge content of the file from the local store 320. Purging may include, deleting, marking for deletion, or the like.

At block 625, the placeholder may be is updated to indicate that the file system object is dehydrated. For example, referring to FIG. 3, the client 305 may update a data structure (e.g., a bitmap) of the placeholder to indicate that content of the file has or will be purged from the local store 320. As another example, the client 305 may update a data structure such as a flag or the like to indicate that content of the file has or will be purged from the local store 320.

At block 630, other actions, if any, may be performed. For example, a maintenance process may iterate over files of the client file system to determine (e.g., based on the factors) whether to hydrate, dehydrate, partially hydrate, or do nothing to each of the files.

Figure 7:
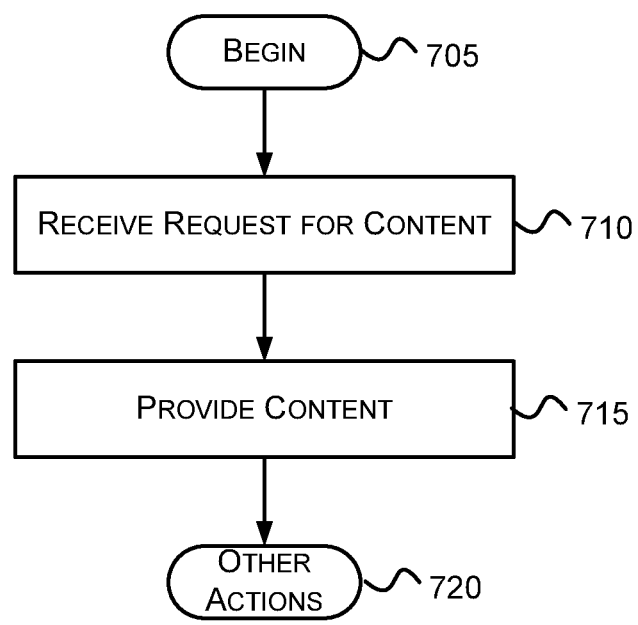
FIG. 7 is a flow diagram that generally represents exemplary actions that may occur from a cloud storage system perspective in accordance with aspects of the subject matter described herein.

FIG. 7 is a flow diagram that generally represents exemplary actions that may occur from a cloud storage system perspective in accordance with aspects of the subject matter described herein. At block 705, the actions begin At block 710, a request for content is received. For example, referring to FIG. 3, the cloud storage system 315 may, from the client 305, receive a request for content for a file system object. This request may be received when a client is attempting to hydrate a file of the client that is represented on the client by a placeholder.

At block 715, the content is provided. For example, referring to FIG. 3, the cloud storage system 315 may provide the requested content to the client 305.

At block 720, other actions may occur. For example, after receiving updated content or metadata for a file, a cloud storage system may send a message to a client to indicate that the file is stale.

As can be seen from the foregoing detailed description, aspects have been described related to file system placeholders. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
receiving an indication of a file system object of a local file system of a client, the client structured to synchronize the local file system with a remote storage system;
evaluating one or more factors to determine an action to take with respect to the file system object, the action selected from actions that include: to hydrate, to dehydrate, and to do nothing with respect to the file system object; and
if the action is to dehydrate the file system object, performing dehydration actions, the dehydration actions comprising:
creating or maintaining a placeholder to represent the file system object, the placeholder being stored on the local file system, the local file system structured to obtain metadata of the file system object from the placeholder, the metadata sufficient to allow the client, while offline with respect to the remote storage system, to obtain namespace information about the file system object from the placeholder, the placeholder including data that identifies the remote storage system from which content of the file is obtainable,
updating the placeholder to indicate that the file system object is dehydrated, and purging the content of the file system object from the local file system while maintaining the metadata of the file system object in the placeholder.

2. The method of claim 1, wherein evaluating one or more factors to determine an action to take with respect to the file system object comprises determining to perform the dehydration actions based on a communication with the remote storage system, the communication indicating that the file system object is stale, the file system object having been edited on another client that also utilizes placeholders.

3. The method of claim 1, wherein evaluating one or more factors to determine an action to take with respect to the file system object comprises determining that a user has indicated that the file system object is to remain available while the client is offline with respect to the remote storage system and maintaining the file system object on the local file system regardless of other of the one or more factors.

4. The method of claim 1, wherein evaluating one or more factors to determine an action to take with respect to the file system object comprises inferring that the file system object is to remain available while the client is offline based on an observed user action with respect to the file system object.

5. The method of claim 4, wherein the observed user action with respect to the file system object comprises creating or editing the file system object.

6. The method of claim 4, wherein the observed user action with respect to the file system object comprises opening the file in at least write mode.

7. The method of claim 1, wherein evaluating one or more factors to determine an action to take with respect to the file system object comprises determining that space is needed on the local file system of the client and that the file system object includes video and is of a size that is greater than a configurable threshold and determining that the action is to dehydrate the file system object.

8. The method of claim 1, wherein evaluating one or more factors to determine an action to take with respect to the file system object is triggered by a requested action with respect to the file system object and further comprising determining to hydrate the file system object, the requested action comprising a request to move the file system object from a namespace associated with the remote storage system to a namespace associated with another remote storage system.

9. The method of claim 1, wherein if the action is to hydrate the file system object, performing hydration actions, the hydration actions comprising:
accessing the placeholder that represents the file system object;
obtaining from the placeholder the data that identifies the remote storage system;
obtaining the content from the remote storage system; and
storing the content on the local file system.

10. The method of claim 9, wherein the hydration actions further comprise:
storing file system metadata for the file system object in the file system;
deleting the placeholder after the file system object is fully hydrated;
until the file system object is dehydrated again, using the file system metadata for subsequent accesses to the file system object.

11. The method of claim 9, wherein the hydration actions further comprise updating the placeholder to indicate that the file system object is fully hydrated.

12. The method of claim 1, further comprising executing a maintenance process that iterates files of the local file system to determine, based on the factors, whether to hydrate, dehydrate, partially hydrate, or do nothing to each of the files.

13. A computing device comprising:
storage hardware and processing hardware;
the storage hardware storing computer storage elements that maintain file system metadata for local file system objects of a local file system and that maintain placeholders for remote file system objects of a remote storage system, the placeholders including metadata of the remote file system objects without requiring that content of the remote file system objects exist in the storaqe hardware;
a placeholder manager, stored by the storage hardware and structured to, when executed by the processing hardware, create, populate, and maintain the placeholders to ensure that a placeholder exists for each remote file system object in the namespace at least if the content of the remote file system object does not completely exist on the storage hardware; and
a hydration/dehydration manager stored by the storage hardware, the hydration/dehydration manager structured to, when executed by the processing hardware, evaluate one or more factors to determine an action to take with respect to the local file system objects, the action selected from actions that include: to hydrate, to partially hydrate, to dehydrate, and to do nothing with respect to the local file system object,
the hydration/dehydration manager further structured to perform, when executed by the processing hardware, dehydration actions with respect to the local file system object, the dehydration actions comprising:
causing a placeholder to be created or maintained on the storage hardware, the placeholder representing the local file system object, the local file system structured to obtain file metadata of the local file system object from the placeholder, the file metadata sufficient to allow the computing device, while offline with respect to the remote storage system, to obtain namespace information about the local file system object from the placeholder, the placeholder including data that identifies the remote storage system from which content of the local file system object is obtainable;

updating the placeholder to indicate that the local file system object is dehydrated; and purging the content of the local file system object from the local file system while maintaining the file metadata of the local file system object in the placeholder.

14. The computing device of claim 13, wherein the hydration/dehydration manager is further structured to perform hydration actions, the hydration actions comprising:

accessing a second placeholder that represents a second file system object;

obtaining from the second placeholder data that identifies the remote storage system;

obtaining content of the second file system object from the remote storage system; and storing the content of the second file system object in the local file system.

15. The computing device of claim 14, wherein the hydration/dehydration manager is further structured to perform additional hydration actions, the additional hydration actions comprising:

storing file system metadata for the second file system object in the local file system;

causing the second placeholder to be deleted after the second file system object is fully hydrated;

until the second file system object is dehydrated, using the file system metadata for the second file system object for subsequent accesses to the second file system object.

16. The computing device of claim 14, wherein the hydration/dehydration manager is further structured to perform additional hydration actions, the additional hydration actions comprising causing the second placeholder to be updated to indicate that the second file system object is fully hydrated and causing the second placeholder and to be maintained on the local file system while the second file system object is fully hydrated.

17. The computing device of claim 14, wherein the hydration/dehydration manager is further structured to periodically iterate files of the local file system to determine, based on the factors, whether to hydrate, dehydrate, or partially hydrate each of the files.

18. The computing device of claim 14, wherein the hydration/dehydration manager is further structured to infer whether the local file system object is to remain available while the computing device is offline with respect to the remote storage system based on an observed user action with respect to the local file system object.

19. A computer storage medium having computer-executable instructions, which when executed perform actions, comprising:

receiving a request for content of a file system object indicated by a client, the client having a client file system, the client file system having file system objects in which all content is located on the client file system and file system objects in which less than all content is located on the client file system, the client having at least placeholders that represent the file system objects in which less than all content is located on the client file system, the client structured to evaluate one or more factors to determine an action to take with respect to a file system object, the action selected from actions that include: to hydrate, to dehydrate, and to do nothing with respect to the file system object, the file system object being dehydrated on the client file system based on the one or more factors, the file system object being represented on the client file system via a placeholder at least while the file system object is dehydrated on the client file system; and providing the content of the file system object from a remote storage system.

20. The computer storage medium of claim 19, further comprising sending a message to the client to indicate that the file system object is stale, the client further structured to determine to dehydrate the file system object based on whether the file system object is stale.

* * * * *